United States Patent
Lee et al.

(10) Patent No.: US 9,432,725 B2
(45) Date of Patent: Aug. 30, 2016

(54) METHOD AND APPARATUS FOR TRANSMITTING CONTENT TO PLURALITY OF DEVICES

(75) Inventors: Jae-min Lee, Suwon-si (KR); Il-ju Na, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 700 days.

(21) Appl. No.: 13/094,040

(22) Filed: Apr. 26, 2011

(65) Prior Publication Data

US 2011/0264752 A1    Oct. 27, 2011

Related U.S. Application Data

(60) Provisional application No. 61/327,793, filed on Apr. 26, 2010.

(30) Foreign Application Priority Data

Apr. 15, 2011 (KR) ........................ 10-2011-0035151

(51) Int. Cl.
| | |
|---|---|
| *H04N 7/01* | (2006.01) |
| *H04N 21/233* | (2011.01) |
| *H04N 21/2343* | (2011.01) |
| *H04N 21/436* | (2011.01) |
| *H04L 12/28* | (2006.01) |
| *H04N 21/4402* | (2011.01) |

(52) U.S. Cl.
CPC .... *H04N 21/43615* (2013.01); *H04L 12/2812* (2013.01); *H04N 21/4402* (2013.01)

(58) Field of Classification Search
USPC .......... 709/202–229, 231, 247; 348/441, 459
See application file for complete search history.

(56) References Cited

U.S. PATENT DOCUMENTS

| | | | | |
|---|---|---|---|---|
| 5,506,954 | A | * | 4/1996 | Arshi et al. .................... 345/501 |
| 5,809,237 | A | * | 9/1998 | Watts et al. ................... 709/202 |
| 7,720,888 | B2 | * | 5/2010 | Kim et al. ..................... 707/809 |

(Continued)

FOREIGN PATENT DOCUMENTS

| | | |
|---|---|---|
| EP | 1848163 A1 | 10/2007 |
| EP | 1967957 A1 | 9/2008 |

(Continued)

OTHER PUBLICATIONS

International Search Report (PCT/ISA/210) issued on Jan. 2, 2012 in the International Patent Application No. PCT/KR2011/003026.

(Continued)

*Primary Examiner* — Andrew Chriss
*Assistant Examiner* — John Lequang
(74) *Attorney, Agent, or Firm* — Sughrue Mion, PLLC

(57) ABSTRACT

A method and apparatus for transmitting content from a source device are provided. The method includes transmitting a message to a branch device and a second device inquiring whether a conversion function for converting content that is streamed to a first device, is installed on the branch device or second device; receiving a response to the transmitted message; transmitting a message requesting conversion of the content to the branch device or the second device, which includes the conversion function; and transmitting the content to the branch device. The content is relayed to the second device by the branch device, and is converted by the branch device or the second device according to performance capabilities of the second device.

20 Claims, 9 Drawing Sheets

(56) References Cited

U.S. PATENT DOCUMENTS

| | | | |
|---|---|---|---|
| 2002/0113817 A1* | 8/2002 | Mitsugi | 345/744 |
| 2003/0028537 A1 | 2/2003 | Nakamura et al. | |
| 2003/0177251 A1* | 9/2003 | Suzuki et al. | 709/229 |
| 2003/0191833 A1* | 10/2003 | Stein et al. | 709/224 |
| 2005/0238033 A1 | 10/2005 | Sakamoto et al. | |
| 2006/0123064 A1 | 6/2006 | Kim et al. | |
| 2006/0245490 A1* | 11/2006 | Yoshizawa et al. | 375/240.01 |
| 2007/0030844 A1* | 2/2007 | Fukuta et al. | 370/359 |
| 2008/0158336 A1 | 7/2008 | Benson et al. | |
| 2008/0177998 A1* | 7/2008 | Apsangi et al. | 713/155 |
| 2009/0296657 A1* | 12/2009 | Omar et al. | 370/331 |
| 2010/0005183 A1 | 1/2010 | Ding et al. | |
| 2011/0083157 A1* | 4/2011 | Addair | 725/120 |
| 2011/0107379 A1* | 5/2011 | Lajoie et al. | 725/87 |

FOREIGN PATENT DOCUMENTS

| | | | |
|---|---|---|---|
| EP | 2111008 A1 | 10/2009 | |
| JP | 2003-46977 A | 2/2003 | |
| JP | 2003-271487 A | 9/2003 | |
| JP | 2005-301459 A | 10/2005 | |
| JP | 2006-311267 A | 11/2006 | |
| JP | 2008-005254 A | 1/2008 | |
| JP | 2010-049525 A | 3/2010 | |
| WO | 2006/075677 A1 | 7/2006 | |
| WO | 2008/153067 A1 | 12/2008 | |
| WO | 2009/010005 A1 | 1/2009 | |

OTHER PUBLICATIONS

Communication dated Feb. 19, 2015, issued by the European Patent Office in counterpart application No. 11775242.8.

Communication dated Dec. 16, 2014, issued by the Japanese Patent Office in counterpart application No. 2013-507880.

Communication from the Japanese Patent Office dated Jun. 30, 2015 in a counterpart Japanese application No. 2013-507880.

* cited by examiner

METHOD AND APPARATUS FOR TRANSMITTING CONTENT TO PLURALITY OF DEVICES

CROSS-REFERENCE TO RELATED PATENT APPLICATION

This application claims the benefit of U.S. Provisional Application No. 61/327,793, filed on Apr. 26, 2010, in the United States Patent and Trademark Office, and claims priority from Korean Patent Application No. 10-2011-0035151, filed on Apr. 15, 2011, in the Korean Intellectual Property Office, the disclosures of which are incorporated by reference herein in their entirety.

BACKGROUND

1. Field

One or more aspects of the exemplary embodiments relate to content transmitting methods and apparatuses, and more particularly, to a method and apparatus for streaming content from a source device to a plurality of devices.

2. Description of the Related Art

A source device may stream content to a plurality of devices. For example, the source device may stream video content to the plurality of devices. In this case, if the capabilities of the plurality of devices are the same, then the content transmitted from the source device may be copied by a branch device, and copies of the content may be relayed to the plurality of devices and displayed on each of the plurality of devices, respectively.

SUMMARY

One or more aspects provide a method and apparatus for transmitting content from a source device to a plurality of devices.

One or more aspects also provide a computer readable recording medium having recorded thereon a program for executing the method.

According to an aspect of one or more exemplary embodiment, there is provided a method of transmitting content from a source device, the method comprising transmitting a message to at least one from among a branch device and a second device, the message inquiring whether a conversion function for converting content that is streamed to a first device, is installed on the branch device or second device; receiving a response to the transmitted message indicating that the conversion function is installed from at least one from among the branch device and the second device; transmitting a message requesting conversion of the content to at least one from among the branch device and the second device, which includes the conversion function; and transmitting the content to the branch device, wherein the content is relayed to the second device by the branch device, and is converted by the branch device or the second device according to performance capabilities of the second device.

According to another aspect of one or more exemplary embodiments, there is provided a method of relaying content by using a branch device, the method comprising receiving a message, from a source device that transmits content to be streamed to a first device, inquiring whether a conversion function is installed, wherein the conversion function is a function for converting the content according to performance capabilities of a second device; transmitting a message indicating that the first function is installed, to the source device; receiving a message from the source device requesting conversion of the content; and receiving the content from the source device, converting the content according to the performance capabilities of the second device, and transmitting the converted content to the second device.

According to another aspect of one or more exemplary embodiments, there is provided a method performed by a second device for allowing the second device to receive content, the method comprising receiving a message, from a source device that transmits content to be streamed to a first device, inquiring whether a conversion function is installed, wherein the conversion function is a function for converting the content according to performance capabilities of a second device; transmitting a message to the source device indicating that the first function is installed; receiving a message from the source device requesting conversion of the content; receiving the content via a branch device that also relays the content to the first device; and converting the content according to the performance capabilities of the second device.

According to another aspect of one or more exemplary embodiments, there is provided an apparatus for transmitting content from a source device, the apparatus comprising a transmission controller for transmitting a message to at least one from among a branch device and a second device, the message inquiring whether a conversion function for converting content that is streamed to a first device, is installed on the branch device or second device; receiving a response to the transmitted message indicating that the conversion function is installed from at least one from among the branch device and the second device; and transmitting a message requesting conversion of the content to at least one from among the branch device and the second device, which includes the conversion function; and a transmission unit for transmitting the content to the branch device, wherein the content is relayed to the second device by the branch device, and is converted by the branch device or the second device according to performance capabilities of the second device.

According to another aspect of one or more exemplary embodiments, there is provided an apparatus for relaying content by using a branch device, the apparatus comprising a relay controller for receiving a message, from a source device that transmits content to be streamed to a first device, inquiring whether a conversion function is installed, wherein the conversion function is a function for converting the content according to performance capabilities of a second device; transmitting a message indicating that the first function is installed, to the source device; and receiving a message from the source device requesting conversion of the content; and a relay unit for receiving the content from the source device, converting the content according to the performance capabilities of the second device, and transmitting the converted content to the second device.

According to another aspect of one or more exemplary embodiments, there is provided an apparatus comprising a receiving controller for receiving a message, from a source device that transmits content to be streamed to a first device, inquiring whether a conversion function is installed, wherein the conversion function is a function for converting the content according to performance capabilities of a second device; transmitting a message to the source device indicating that the first function is installed; and receiving a message from the source device requesting conversion of the content; and a receiving unit for receiving the content via a branch device that also relays the content to the first device, wherein the content is converted according to the performance capabilities of the apparatus.

According to another aspect of one or more exemplary embodiments, there is provided a computer readable recording medium having recorded thereon a program for executing the methods described above.

BRIEF DESCRIPTION OF THE DRAWINGS

The above and other aspects will become more apparent by describing in detail exemplary embodiments thereof with reference to the attached drawings in which.

DETAILED DESCRIPTION

The present inventive concept will now be described more fully with reference to the accompanying drawings, in which exemplary embodiments are shown.

Figure 1:
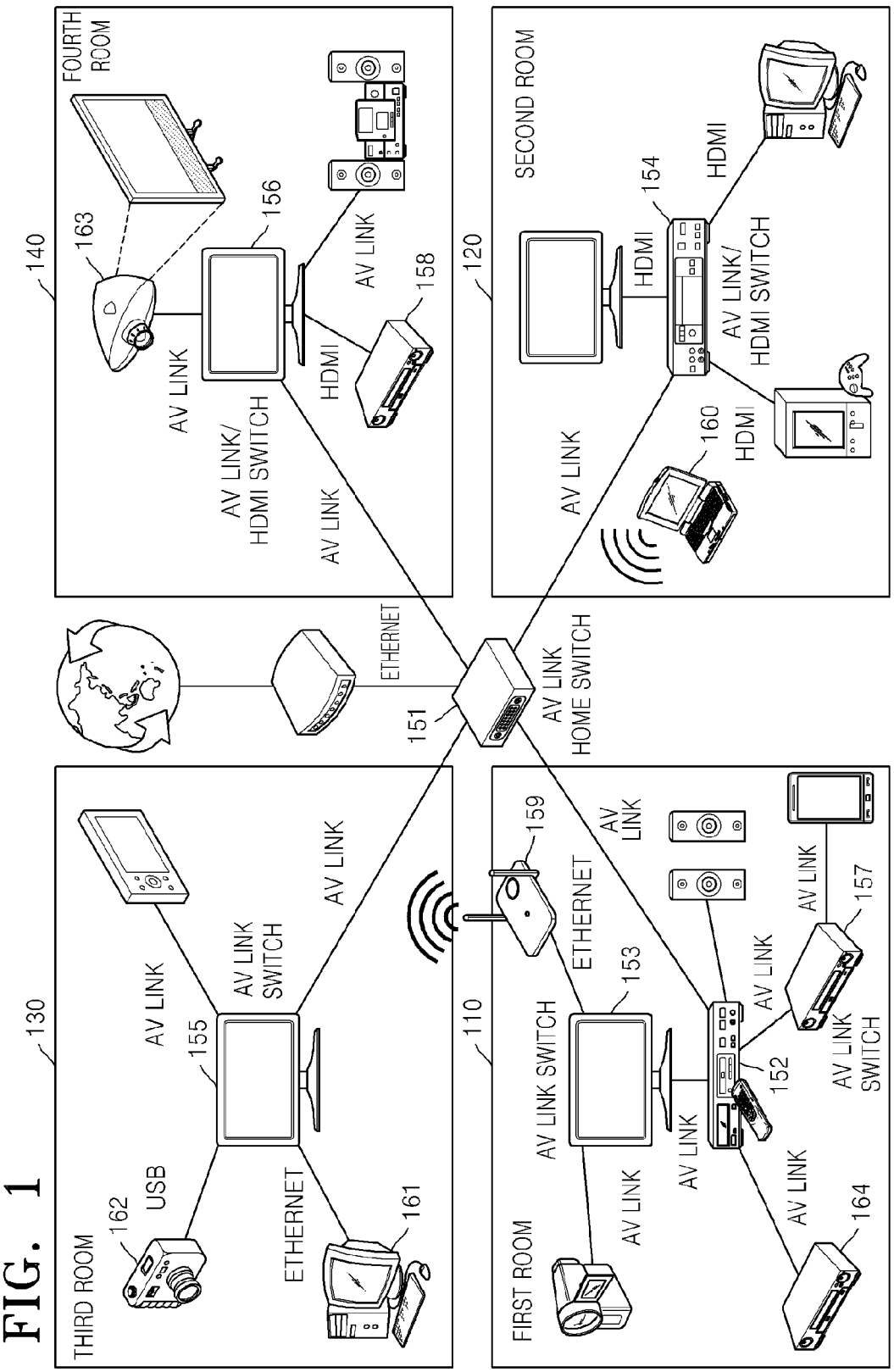
FIG. 1 is a diagram of a network topology of devices connected to one another through an audio/video (AV) interface, according to an exemplary embodiment.

FIG. 1 is a diagram of a network topology of devices connected to one another through an audio/video (AV) interface, according to an exemplary embodiment. The AV interface is an interface for transmitting and receiving AV data. An 'AV link' is established based on the AV interface according to an exemplary embodiment, and a high-definition multimedia interface (HDMI) is a connection via a HDMI cable.

Referring to FIG. 1, AV devices may establish networks through the AV interface according to an exemplary embodiment. The AV devices disposed in a plurality of rooms may be connected to various types of AV devices disposed in rooms that are the same as or different from the plurality of rooms through the AV interface according to the present exemplary embodiment. In this regard, a switch device for relaying AV link relays a connection based on the AV interface. The switch device may be a separate device for relaying the AV link, such as an AV link home switch 151 or AV devices, namely, an AV receiver 152, a TV 153, a switch device 154, a TV 155, a TV 156, or a Blu-ray player 157 each having a switch function. In a first room 110, an AV receiver 152, a TV 153, and a Blu-ray player 157 that are each an AV device act as a switch device, and in a third room 130 and a fourth room 140, TVs 155 and 156 that are each an AV device act as a switch device.

In addition, the switch device may be a device for switching the AV interface according to the present exemplary embodiment and the HDMI. For example, a switch device 154 in a second room 120 may receive AV data from a computer and a game station through the HDMI and may transmit the received AV data to devices disposed in the first room 110, the third room 130, and the fourth room 140 through the AV link according to the present exemplary embodiment.

The devices of a network shown in FIG. 1 may be divided into a source/leaf device, a source/switch device, a switch device, a sink/switch device, and a sink/leaf device according to their roles.

A device for providing the AV data without relaying the AV link, such as a set-top box (STB) 164 in the first room 110, corresponds to a source/leaf device, and a device for providing the AV data to another device and relaying the AV link, such as the Blu-ray player 157 in the first room 110, corresponds to a source/switch device. In addition, a device for performing only relaying of the AV links, such as the AV link home switch 151, corresponds to a switch device, and a device for receiving the AV data from another device and relaying the AV link, such as the TV 156 in the fourth room 140, corresponds to a sink/switch device. Lastly, a device for receiving the AV data from another device without relaying the AV link, such as a projector 163 in the fourth room 140, corresponds to a sink/leaf device.

According to the network structure of FIG. 1, AV data output from the Blu-ray player 157 in the first room 110 may be transmitted to the TV 155 in the third room 130 or the TV 156 in the fourth room 140 through the AV receiver 152 and the AV link home switch 151. In addition, a broadcasting signal received by a STB 158 in the fourth room 140 may be transmitted to the TV 155 in the third room 130 through the AV link home switch 151 and to the TV 153 in the first room 110 through the AV link home switch 151 and the AV receiver 152.

In other words, in order to freely transmit and receive the AV data in a network based on the AV interface (hereinafter, referred to as an 'AV network'), as illustrated in FIG. 1, the AV interface according to the present exemplary embodiment supports bidirectional data transmission.

An AV interface according to the related art, such as a digital visual interface (DVI) or a HDMI, supports unidirectional data transmission from a source device to a sink device. AV data output from the source device is transmitted only to the sink device, and the sink device may not transmit the AV data to the source device through the AV interface according to the related art, such as the DVI or HDMI. For example, in a related art arrangement, the TV 156 that is a sink device in the fourth room 140 may receive the AV data from the STB 158 connected to the TV 156 via the HDMI but may not transmit the AV data to the STB 158.

However, in the AV link through the AV interface according to the present exemplary embodiment, bidirectional data transmission may be supported, and data may be transmitted to a device in another room in the network structure of FIG. 1, and data may be received from the device in another room. In particular, in the AV link according to the present exemplary embodiment, bidirectional transmission of uncompressed video data may be performed. Thus, bidirectional data transmission will now be described below with reference to FIGS. 2A and 2B in detail.

Figure 2A:
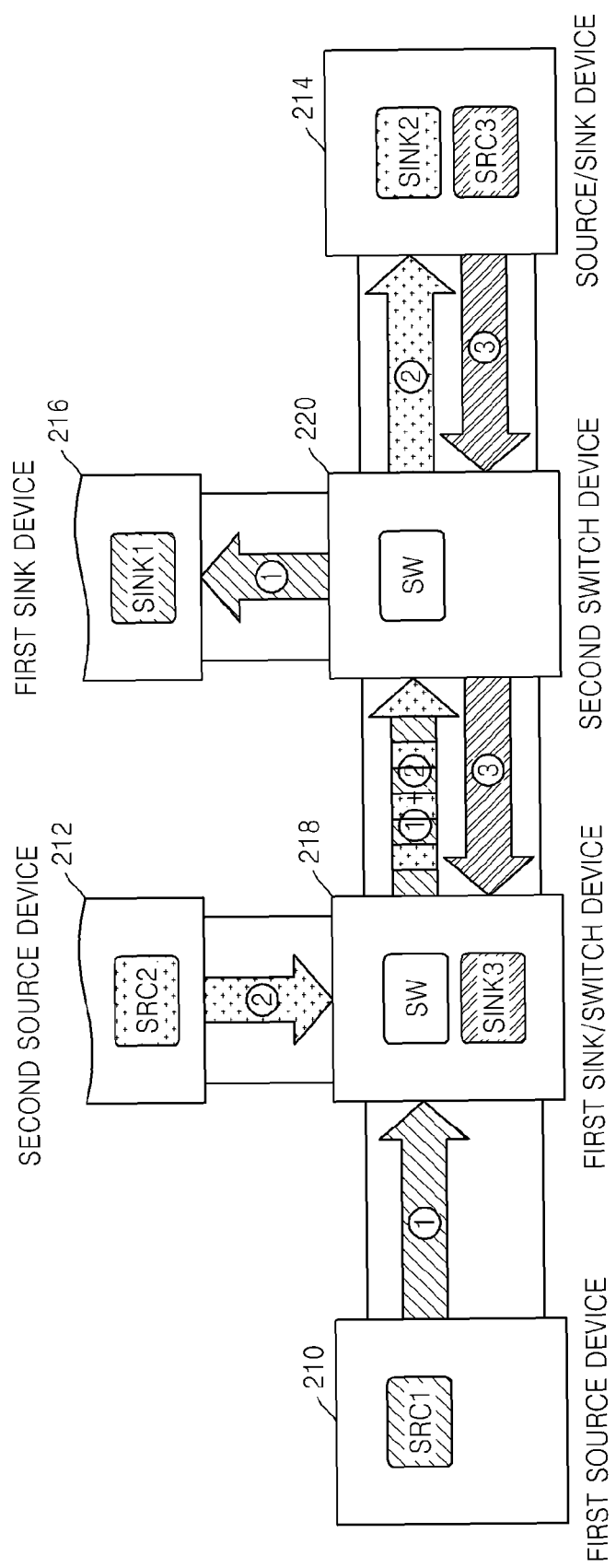
FIG. 2A is a diagram of bidirectional data transmission through an AV interface, according to an exemplary embodiment.

FIG. 2A is a diagram of bidirectional data transmission through an AV interface, according to an exemplary embodiment.

Referring to FIG. 2A, AV data, for example, uncompressed video data output from a first source device 210, for example, a Blu-ray player, may be reproduced by a first sink device 216, for example, a projector, and AV data output from a second source device 212, for example, a STB, may be reproduced by a source/sink device 214, for example, a personal computer (PC), and AV data output from the source/sink device 214 may be reproduced by a first sink/switch device 218, for example, a TV.

The first sink/switch device 218 receives the AV data output from the first source device 210 and the AV data output from the second source device 212 and then performs time division duplex on the received AV data and transmits the time division duplexed-AV data to a second switch device 220.

The second switch device 220 that receives the AV data output from the first source device 210 and the AV data output from the second source device 212 relays the received data to transmit the AV data output from the first source device 210 to the first sink device 216 and to transmit the AV data output from the second source device 212 to the source/sink device 214. In addition, the second switch device 220 receives the AV data from the source/sink device 214 and transmits the received AV data to the first sink/switch device 218.

In a link between the first sink/switch device 218 and the second switch device 220 and a link between the second switch device 220 and the source/sink device 214, AV data, i.e., uncompressed video data is transmitted not in a unidirectional manner but in a bidirectional manner. Thus, when devices illustrated in FIG. 2A are respectively connected to one another via one AV interface cable, the AV interface may perform bidirectional data transmission via one cable and may transmit AV data received from a plurality of source devices by using time division duplex.

Figure 2B:
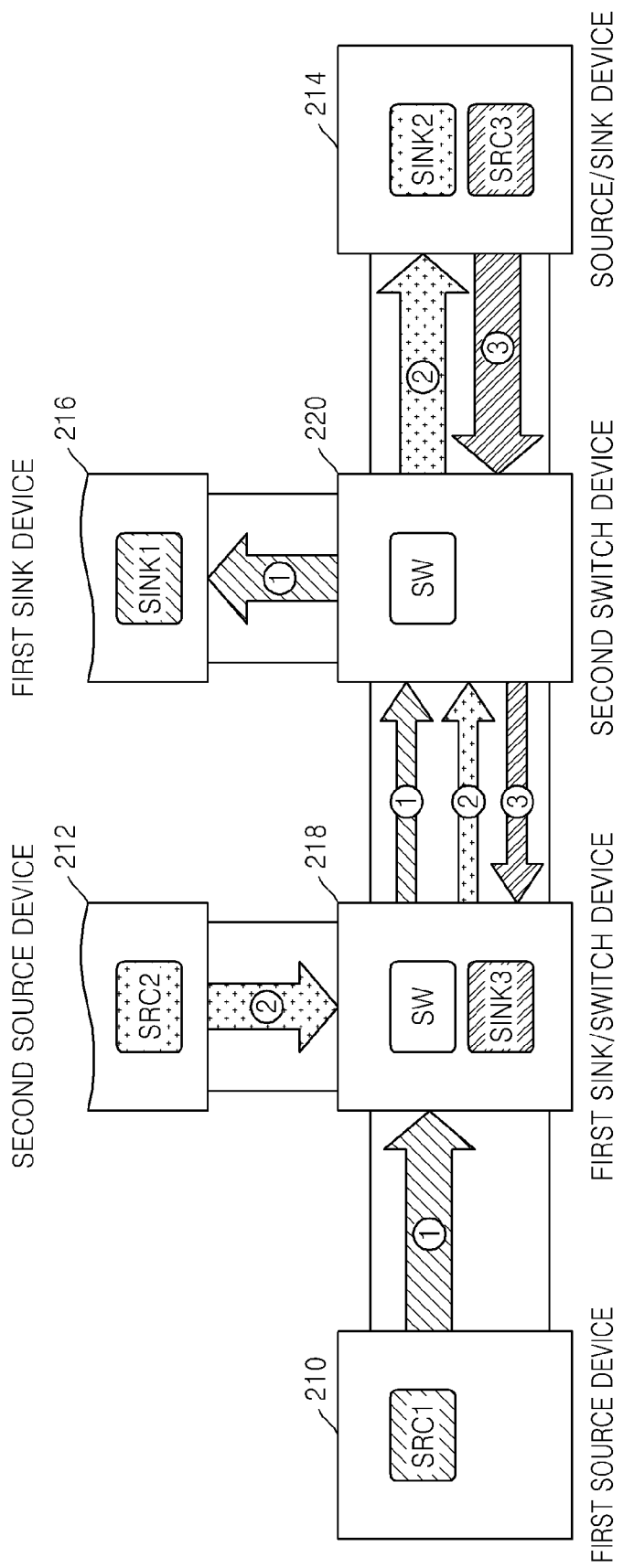
FIG. 2B is a diagram of bidirectional data transmission through an AV interface, according to another exemplary embodiment.

FIG. 2B is a diagram of bidirectional data transmission through an AV interface, according to another exemplary embodiment.

Referring to FIG. 2B, AV data, for example, uncompressed video data output from the first source device 210, for example, a Blu-ray player, may be reproduced by the first sink device 216, for example, a projector, and AV data output from the second source device 212, for example, a STB, may be produced by the source/sink device 214, for example, a PC, and AV data output from the source/sink device 214 may be reproduced by the first sink/switch device 218, for example, a TV.

FIG. 2A illustrates a method of transmitting and receiving data by using time division duplex. By contrast, FIG. 2B illustrates a method of transmitting and receiving data by using space division duplex. The AV link based on the AV interface according to the present exemplary embodiment may include a plurality of sub-links. In addition, the plurality of sub-links may correspond to a plurality of lanes indicating a physical connection between devices and spatially separated from one another. Thus, as illustrated in FIG. 2B, AV data may be transmitted and received by using space division duplex based on the plurality of sub-links.

For example, the first sink/switch device 218 of FIG. 2B may transmit AV data output from the first source device 210 and AV data output from the second source device 212 by using space division duplex using two sub-links. Similarly, AV data output from the source/sink device 214 may be received from the second switch device 220 by using another sub-link.

An AV interface according to the related art, such as a DVI or a HDMI, cannot perform bidirectional transmission of AV data. Thus, a data transmission network cannot be established using the AV interface. However, since the AV interface according to the present exemplary embodiment may perform bidirectional data transmission via one cable, as illustrated in FIGS. 2A and 2B, a network in which various devices are connected to one another, may be flexibly established.

Referring back to FIG. 1, various types of data, i.e., Ethernet data, universal serial bus (USB) data or the like, as well as AV data, may be transmitted and received through the AV interface according to the present exemplary embodiment. A case where a laptop 160 disposed in the second room 120 transmits Ethernet data to a PC 161 disposed in the third room 130 via a wireless router 159 installed in the first room 110 will now be described. Ethernet data is data generally transmitted via a transmission control protocol/Internet protocol (TCP/IP)-based LAN.

Since the AV interface according to the present exemplary embodiment supports bidirectional data transmission, unlike the AV interface according to the related art, Ethernet data may be transmitted and received through the AV interface. Thus, the laptop 160 transmits the Ethernet data to the PC 161 via a network established with AV link. To this end, the switch devices disposed in the network of FIG. 1 have a function for relaying the Ethernet data. The Ethernet data is transmitted to the PC 161 from the wireless router 159 by switching of a link layer.

According to another exemplary embodiment, when USB data output from a camera 162 is transmitted to the laptop 160, the switch devices transmit the USB data to the laptop 160 by using a switch function of the USB data. Since various types of data, as well as the AV data, are transmitted through the AV interface, various devices may access a network connected via the AV interface and may transmit and receive data freely. The switch devices relay the USB data by switching of a link layer.

In addition, data for controlling a device and a network may be transmitted and received through the AV interface according to the present exemplary embodiment. For example, a user may control the AV receiver 152 disposed in the same room as the first room 110 by using the TV 153 disposed in the first room 110. The user manipulates the TV 153 and transmits data for controlling the AV receiver 152 through the AV interface, thereby controlling the AV receiver 152. In addition, the user may control the TV 156 or the STB 158 disposed in another room 140 and accessing the network established using the AV interface, through the AV interface.

Since the data for controlling the network connected via the AV interface may be transmitted and received through the AV interface, data for managing a network, as well as for setting a link, may be transmitted and received as data for controlling a network through the AV interface.

Since various types of data are transmitted and received through the AV interface, a transmission unit of the AV network may include information about the types of data. The information about the types of data may be included in a header in the transmission unit of the AV network.

In addition, power may also be supplied through the AV interface according to the present exemplary embodiment. Like a supply of power through a USB interface, predetermined power may be supplied to a mobile device through the AV link. By supplying power through the AV link, power for charging or operating the mobile device is supplied.

Figure 3:
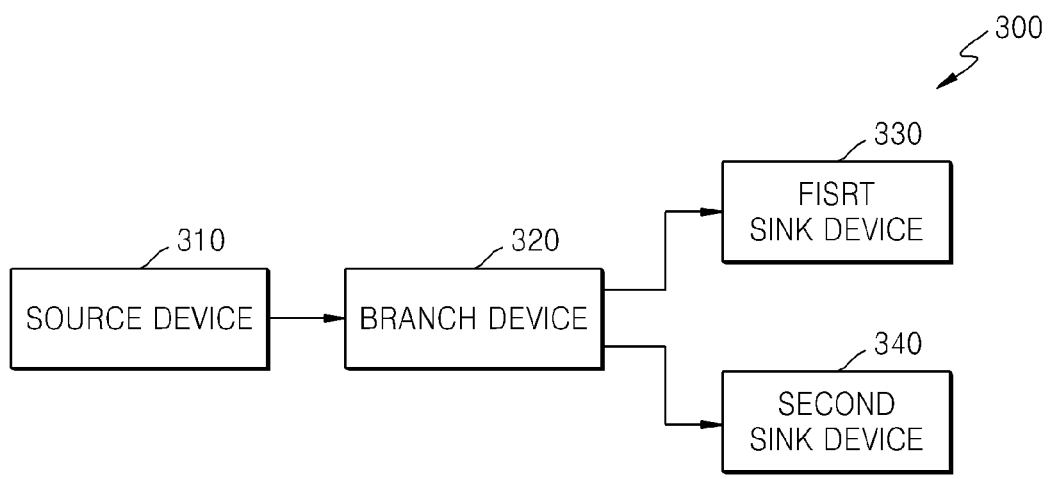
FIG. 3 is a block diagram of a system for streaming content to a plurality of devices, according to an exemplary embodiment.

FIG. 3 is a block diagram of a system 300 for streaming content to a plurality of devices, according to an exemplary embodiment.

Referring to FIG. 3, a source device 310 streams content to a first sink device 330 and a second sink device 340. The source device 310 may transmit the same content to the first sink device 330 and the second sink device 340, and the first sink device 330 and the second sink device 340 may simultaneously reproduce the same content received from the source device 310. A branch device 320 relays the content transmitted from the source device 310 to the first sink device 330 and the second sink device 340

The source device 310, the branch device 320, the first sink device 330, and the second sink device 340 may be devices connected via the AV interface described above with reference to FIGS. 1, 2A, and 2B. However, the present inventive concept is not limited thereto, and the source device 310, the branch device 320, the first sink device 330, and the second sink device 340 may be various types of devices that may be connected according to a network topology illustrated in FIG. 3.

Referring to FIG. 3, for multiple streaming in which the first sink device 330 and the second sink device 340 may simultaneously reproduce the same content received from the source device 310, the source device 310 may set content to be individually streamed to the first sink device 330 and the second sink device 330.

Content, which is to be transmitted to the first sink device 330 and the second sink device 340, is multiplexed and transmitted to the branch device 320 by using time or space-division duplexing through the AV interface described above. Then, the branch device 320 may transmit the content to both the first sink device 330 and the second sink device 340 by switching the data. In this case, the branch device 320 functions as a switching device as described above. However, bandwidth waste may be caused during multiple streaming performed based on a plurality of streaming processes set individually. In other words, although the same content is transmitted to the first sink device 330 and the second sink device 340, a bandwidth that the source device 310 uses for multiple streaming is two times a bandwidth for streaming content to one device.

To reduce such a waste of a bandwidth, the branch device 320 may perform content replication. The source device 310 transmits content to the branch device 320, similar to a way in which the content is streamed to only one device. The branch device 320 makes copies of the content and transmits them to the first sink device 330 and the second sink device 340, respectively. In this case, the source device 310 may perform multiple streaming by using the same bandwidth as when the content is streamed to only one device. This method is a multiple streaming method that may be performed when the branch device 320 connected to both the first sink device 330 and the second sink device 340 has a content replication function.

However, an error may occur in the multiple streaming method using the content replication function, when the performances of the first sink device 330 and the second sink device 340 are different from each other For example, it is assumed that the first sink device 330 may reproduce video content encoded having a resolution of 480P, 720P, or 1080P and the second sink device 340 may reproduce video content encoded having a resolution of 480P or 720P. In this case, for multiple streaming, the source device 310 may transmit video content encoded having, for example, the resolution of 720P, to the first and second sink devices 330 and 340 in consideration of both the performances of the first and second sink devices 330 and 340. That is, although the first sink device 330 is capable of reproducing the video content having the resolution of 1080P, which is higher than a resolution of 720P, the video content having the resolution of 720P is transmitted to the first and sink devices 330 and 340, based on the performance of the second sink device 340.

If the source device 310 transmits the video content having the resolution of 1080P based on only the performance of the first sink device 330 so as to increase satisfaction of a user of the first sink device 330, then the second sink device 340 cannot reproduce the video content having the resolution of 1080P, thereby preventing multiple streaming from being performed.

Thus, in the multiple streaming method according to the current exemplary embodiment, the source device 310 determines whether the branch device 320 and the second sink device 340 have a content conversion function, and transmits content to the second sink device 340 based on a result of determining. For example, the source device 310 may transmit content that the first sink device 330 whose performance is better than that of the second sink device 340 may reproduce, to the branch device 320, and the branch device 320 may convert the content according to the performance of the second sink device 340 and transmit the converted content to the second sink device 34. Otherwise, the branch device 320 may make a copy of the content and transmit the copy of the content to the second sink device 340, and the second sink device 340 may convert and reproduce the copy of the content received from the branch device 320.

A function of converting content having a high resolution to content having a low resolution, as the content conversion function, has been described above with reference to FIG. 3. However, the present inventive concept is not limited thereto and one of various functions of converting content according to the performance of the second sink device 340 may be used. For example, the content conversion function may be a function of AV content encoded according to a first codec that the first sink device 330 uses to AV content encoded according to a second codec that the second sink device 340 uses. Also, the content conversion function may be down scaling for converting high-resolution content to low-resolution content, or up-scaling for converting low-resolution content to high-resolution content.

Operations that the source device 310, the branch device 320, the first sink device 330, and second sink device 340 perform to determine whether a device has the content conversion function will now be described in detail with reference to FIGS. 4 to 7.

Figure 4:
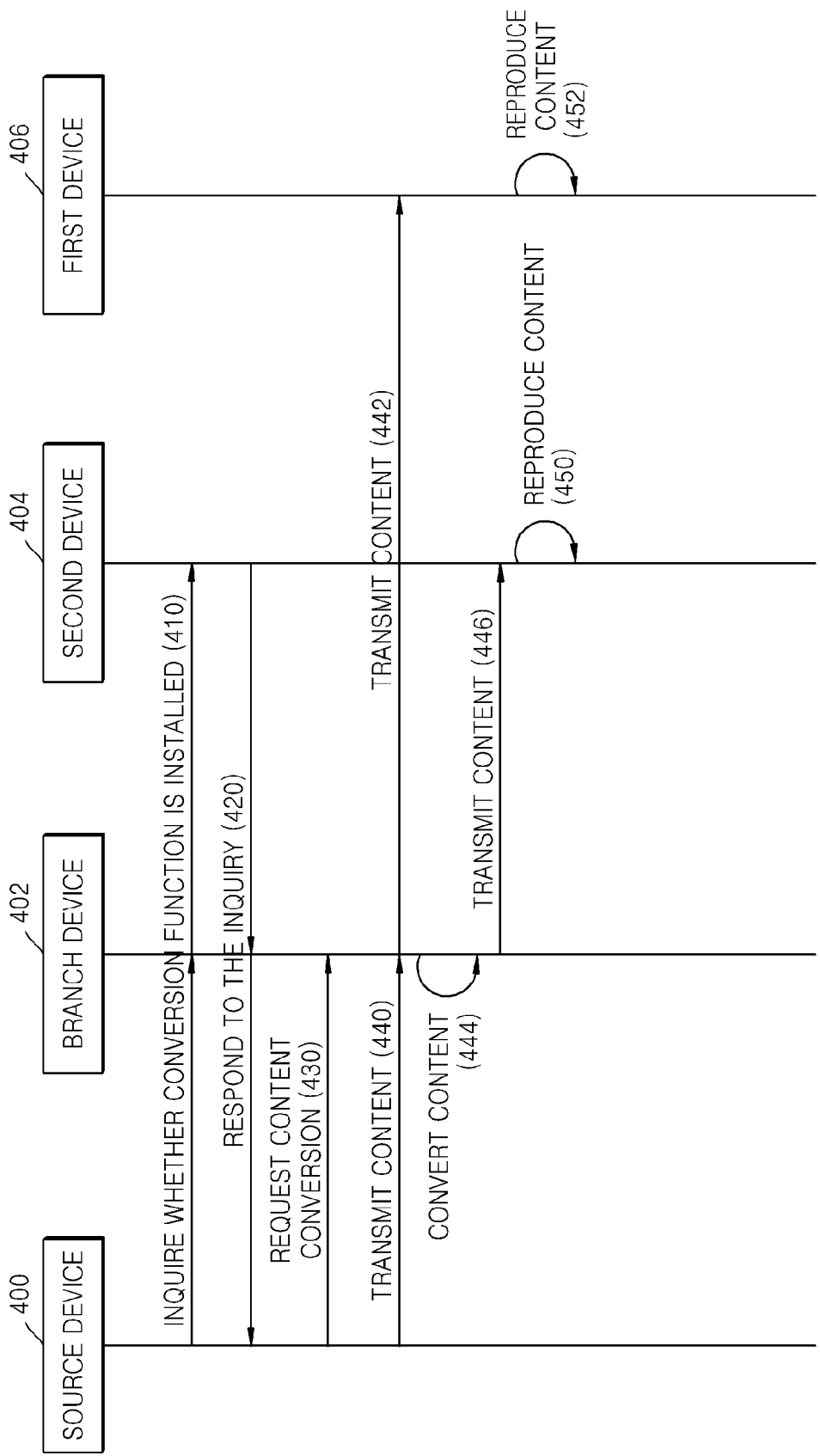
FIG. 4 is a flowchart illustrating a streaming method according to an exemplary embodiment.

FIG. 4 is a flowchart illustrating a streaming method according to an exemplary embodiment. Specifically, FIG. 4 illustrates a multiple streaming method, in which a source device 400 simultaneously transmits content to a first device 406 and a second device 404. Hereinafter, content streamed according to a streaming method according to an exemplary embodiment may be uncompressed video content, and the source device 400, the branch device 402, the first device 406, and the second device 404 may be connected via the AV interface described above.

Referring to FIG. 4, in operation 410, the source device 400 inquires of at least one from among the branch device 402 and the second device 404 about whether a content conversion function is installed therein. In other words, the source device 400 inquires of at least one from among the branch device 402 and the second device 404 about whether at least one from among the branch device 402 and the second device 404 is capable of converting content according to performance of the second device 404. To this end, the source device 400 may transmit a message inquiring whether the content conversion function is installed to at least one from among the branch device 402 and the second device 404.

In operation 420, the source device 400 receives a reply indicating whether the content conversion function is installed from at least one from among the branch device 402 and the second device 404. The source device 400 may receive a message indicating whether the content conversion function is installed from at least one from among the branch device 402 and the second device 404.

If the content conversion function is not installed in at least one from among the branch device 402 and the second device 404, the source device 400 may explicitly receive a message indicating that the content conversion function is not installed. Also, if no reply is received from at least one from among the branch device 402 and the second device 404 for a predetermined time period, the source device 400 may determine that the content conversion function is not installed in the branch device 402 and/or the second device 404 that does not respond to the inquiry. The content conversion function may be a function of converting the resolution of uncompressed video content to a resolution so that the second device 404 may reproduce the video content.

The inquiry and reply in operations 410 and 420 may be conducted while the source device 400, the branch device 402, and the second device 404 form a network together. For example, when at least one from among the branch device 402 and the second device 404 is connected to the source device 400, operations 410 and 420 may be performed to inquire about whether the content conversion function is installed. Operations 410 and 420 may be performed when joining or association is performed between devices connected in a network after device discovery and a connection setup are performed.

When the network is formed, the source device 400, the branch device 402, and the second device 404 exchange information regarding the performance thereof with each other. In this case, operations 410 and 420 may be performed by including information regarding whether the content conversion function is installed into the information regarding the performance.

In operation 430, if it is determined from the reply received in operation 420 that the branch device 402 has the content conversion function, the source device 400 requests the branch device 402 to perform content conversion. If only the branch device 402 has the content conversion function, the request for content conversion may be transmitted to the branch device 402. If both the branch device 402 and the second device 404 have the content conversion function, the request for content conversion may also be transmitted to the second device 404 in addition to the branch device 402.

In operation 440, the source device 400 transmits content to the branch device 402. That is, the source device 400 transmits content, which is to be streamed to the branch first device 406, to the branch device 402.

In operation 442, the branch device 402 transmits the content received from the source device 400 to the first device 406. The content received from the source device 400 in operation 440 is to be streamed to the first device 406. The branch device 402 does not convert this content and directly relays this content to the first device 406.

In operation 444, the branch device 402 converts the content received in operation 440. The content received from the source device 400 in operation 440 is to be streamed to the first device 406, and if the content is directly relayed to the second device 404, the second device 404 cannot reproduce the content. Thus, the branch device 402 converts the content received in operation 440 according to the performance capabilities of the second device 404. Since in operation 430, the source device 400 requests the branch device 402 to perform content conversion, the branch device 402 converts the content, instead of the second device 404.

In operation 446, the branch device 402 transmits the converted content to the second device 404.

In operation 450, the second device 404 reproduces the content received in operation 446. Since the received content was converted by the branch device 402 in operation 444, the second device 404 can reproduce the received content.

In operation 452, the first device 406 reproduces the content received in operation 442. Since the first device 406 and the second device 404 simultaneously reproduce the content transmitted from the source device 400 in operations 452 and 450, respectively, multiple streaming is performed. Furthermore, an available bandwidth of the source device 400 may be efficiently used, since multiple streaming is performed in such a manner that the source device 400 does not directly transmit the content to both the first and second devices 404 and 406 but transmits the content only to the branch device 402.

Figure 5:
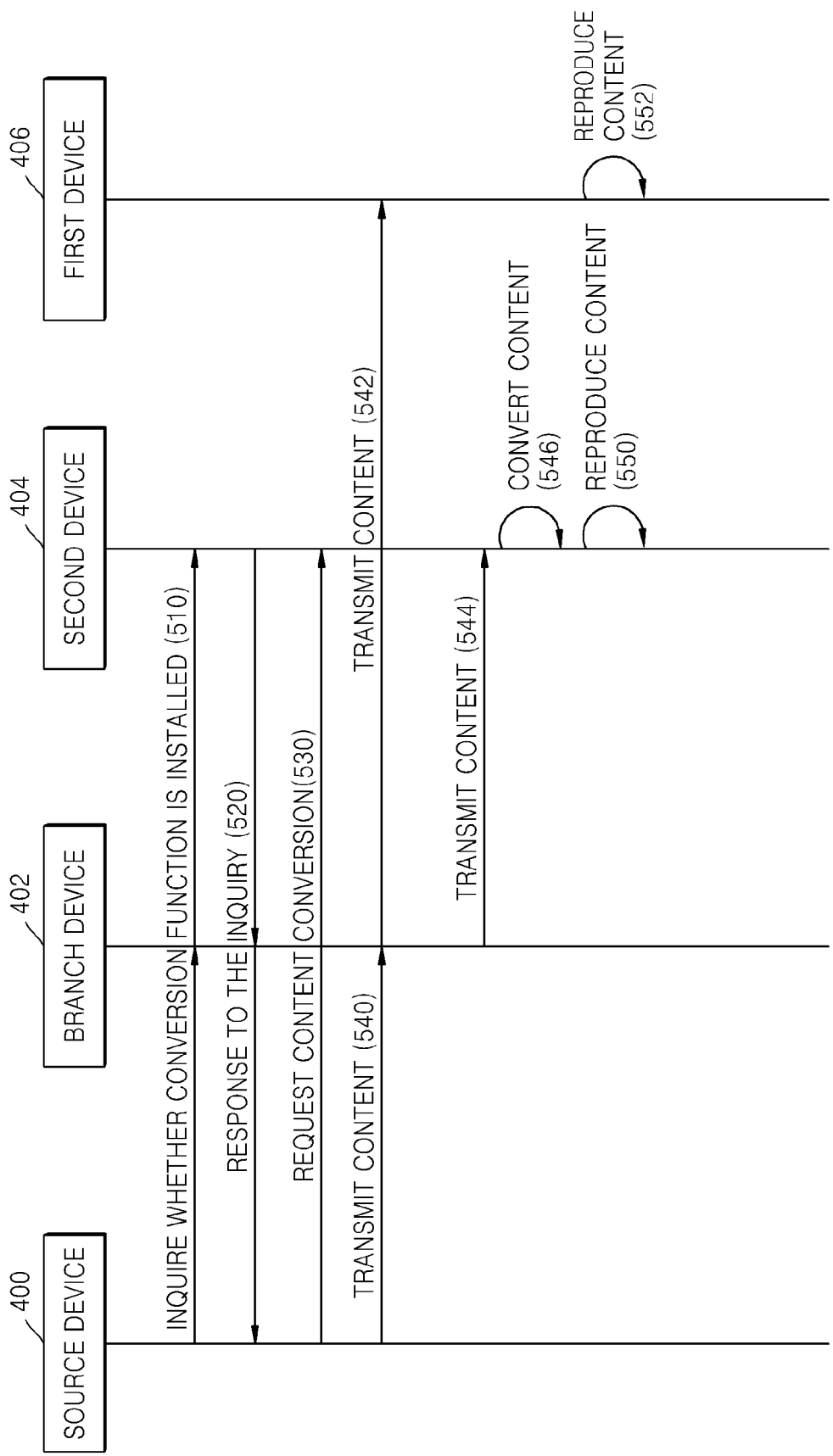
FIG. 5 is a flowchart illustrating a streaming method according to another exemplary embodiment.

FIG. 5 is a flowchart illustrating a streaming method according to another exemplary embodiment.

Referring to FIG. 5, in operation 510, a source device 400 inquires of at least one from among a branch device 402 and a second device 404 about whether a content conversion function is installed therein. In operation 520, the source device 400 receives a reply indicating whether the content conversion function is installed, from at least one from among the branch device 402 and the second device 404. Operations 510 and 520 correspond to operations 410 and 420 of FIG. 4, respectively.

In operation 530, if it is determined from the replay received in operation 520 that the second device 404 has the content conversion function, then the source device 400 requests the second device 404 to perform content conversion. If only the second device 404 has the content conversion function, the request for content conversion may be transmitted to the second device 404. If both the branch device 402 and the second device 404 have the content conversion function, the request for content conversion may also be transmitted to the branch device in addition to the second device 404.

In operation 540, the source device 400 transmits content to the branch device 402. The content that is to be streamed to the first device 406 is transmitted to the branch device 402.

In operation 542, the branch device 402 transmits the content received from the source device 400 to the first device 406. In operation 544, the branch device 402 transmits the content received from the source device 400 to the second device 404. The content received from the source device 400 is directly transmitted to the first device 406 and the second device 404.

In operation 546, the second device 404 converts the content received in operation 544. The content relayed by the branch device 402 in operations 540 and 544 is the same as the content to be streamed to the first device 406, and thus, the second device 404 cannot reproduce this content.

Accordingly, the second device 404 itself converts the content received in operation 544 according to the performance of the second device 404. Since the source device 400 requests the second device 404 to perform content conversion in operation 530, the second device 404 converts the content, instead of the branch device 402.

In operation 550, the second device 404 reproduces the converted content. In operation 552, the first device 406 reproduces the content received in operation 542.

Figure 6:
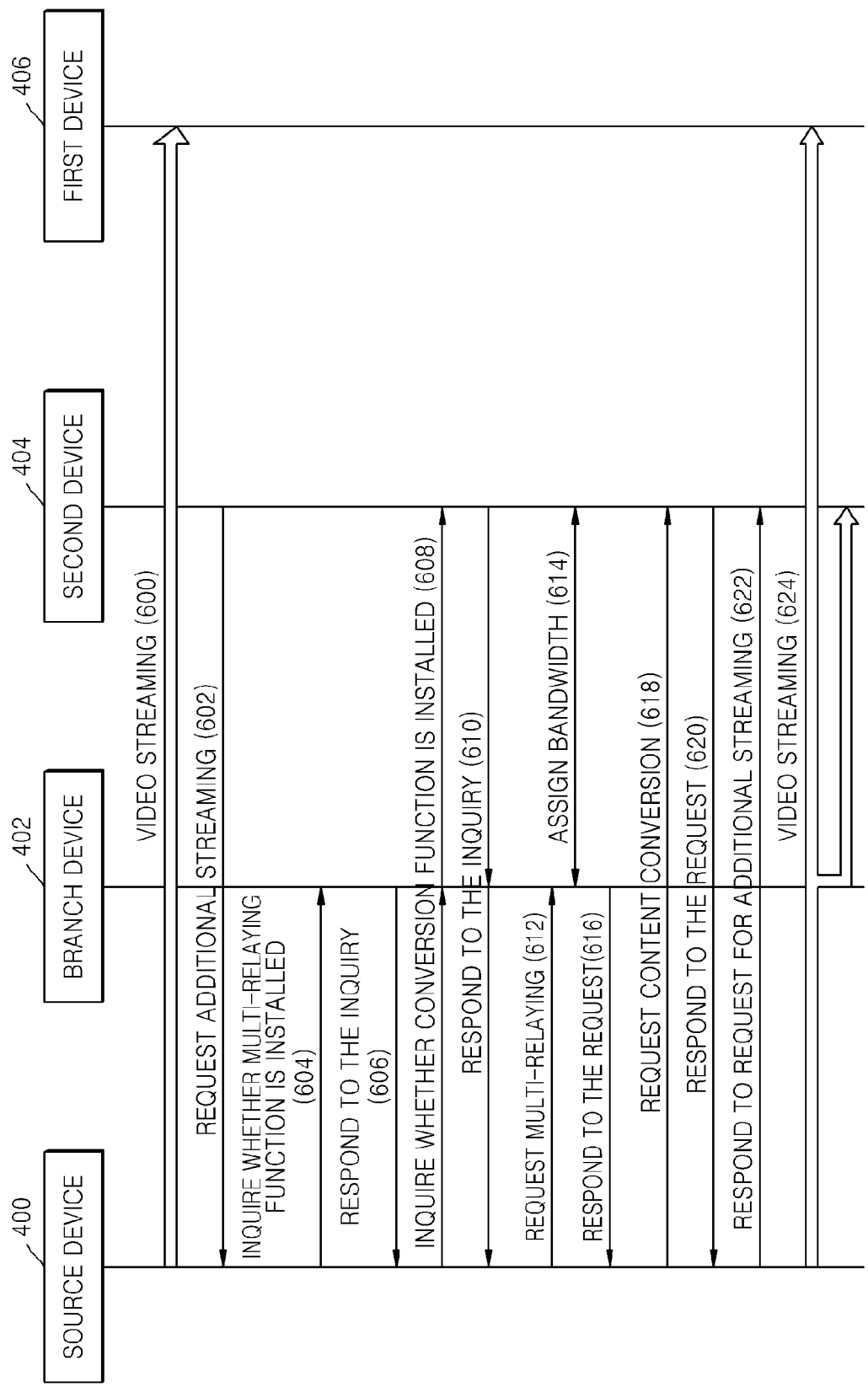
FIG. 6 is a flowchart illustrating a streaming method according to another exemplary embodiment.

FIG. 6 is a flowchart illustrating a streaming method according to another exemplary embodiment.

Referring to FIG. 6, in operation 600, a source device 400 streams content to the first device 406. The content may be uncompressed video content.

In operation 602, a second device 404 requests the source device 400 to additionally stream the content thereto. In other words, in operation 600, the content that is being streamed to the first device 406 is requested to be also streamed to the second device 404. If the second device 404 is newly connected to a network while the source device 400 streams the content to the first device 406, a message requesting additional streaming of the content may be transmitted to the source device 400. Otherwise, if the second device 404 has already connected to the network but does not receive the content, the second device 404 may transmit the message to the source device 400. Otherwise, the message may be transmitted to the source device 400 so as to set a connection between the source device 400 and the second device 404, according to an input by a user of the second device 404.

An identifier, e.g., an index, for identifying a streaming process may be assigned to a streaming process performed in the network to which the source device 400, the branch device 402, the first device 406, and the second device 404 belong. The second device 404 may request the source device 400 to additionally stream the content, based on the assigned identifier. For example, the second device 404 may produce a message requesting additional streaming of the content, based on an identifier assigned to the content streamed in operation 600, and transmit the message to the source device 400.

Referring to FIG. 6, in operation 602, the second device 404 transmits the message requesting additional streaming of the content to the source device 400, but the present inventive concept is not limited thereto and a third device other than the second device 404 may transmit the message to the source device 400. The third device may be a coordinator device that manages a network connection or a device that manages streaming in a network. The third device that manages streaming in a network may be an initiator device that manages additional streaming.

If the third device requests initiating of additional streaming and an event related to this streaming, e.g., stopping or pausing of the streaming, occurs, then a message regarding the event may be transmitted to the third device.

The message transmitted in operation 602 may be an application-layer message. An application of the second device 404 may transmit the message to an application of the source device 400. In order to transmit the message from the third device to the source device 400, an application of the third device may transmit the message to the application of the source device 400.

In operation 604, the source device 400 inquires of the branch device 402 about whether the branch device 402 has a multi-relay function. In operation 606, the source device 400 receives a reply to the inquiry in operation 604. The branch device 402 usually, but not necessarily always, will have the multi-relay function, i.e., a function of copying and relaying content, so as to stream the content to the first device 406 and the second device 404. In other words, multiple streaming may be performed when the branch device 402 has a function of relaying content, which is being streamed to the first device 406, to the second device 404. For this reason, in operations 604 and 606, the source device 400 transmits, for example, a message inquiring whether the branch device 402 has the multi-relay function and receives a reply to the inquiry from the branch device 402.

The message that the source device 400 receives in operation 606 may indicates that the branch device 402 has the multi-relay function. If the branch device 402 does not have the multi-relay function, the source device 400 may explicitly receive a message indicating this fact from the branch device 402. If the branch device 402 does not respond to the inquiry for a predetermined time period, the source device 400 may determine that the branch device 402 does not have the multi-relay function.

If it is determined in operations 604 and 606 that the branch device 402 does not have the multi-relay function, then operations 608 to 624 are performed.

In operation 608, the source device 400 inquires of at least one from among the branch device 402 and the second device 404 about whether a content conversion function is installed therein. In operation 610, the source device 400 receives a reply to the inquiry from at least one among the branch device 402 and the second device 404. Operations 608 and 610 correspond to operations 410 and 420 of FIG. 4, respectively.

In operation 612, the source device 400 requests the branch device 402 to perform multi-relaying. In other words, the source device 400 transmits a message requesting the content, which is being streamed to the first device 406, to be copied and relayed to the second device 404, to the branch device 402.

In operation 614, the branch device 402 assigns a bandwidth for relaying and transmitting the content to the second device 404. The branch device 402 determines whether an available bandwidth for a link to the second device 404 is present, and determines whether the available bandwidth, if any, is sufficient for content streaming. If it is determined that the available bandwidth is sufficient, the branch device 402 requests the second device 404 to assign the bandwidth, and enables the multi-relay function when it is determined that the assigning of the bandwidth is successful.

In operation 616, the branch device 402 transmits a message indicating that preparation for multi-relaying is completed to the source device 400. That is, a message indicating that preparation for relaying the content, which is being streamed to the first device 406, to the second device 404 is transmitted to the source device 400.

In operation 618, the source device 400 requests the second device 404 to perform content conversion. The source device 400 may transmit a message requesting conversion of the content to be transmitted from the source device 400 according to the performance of the second device 404, to the second device 404. If only the second device 404 has the content conversion function, the second device 404 is requested to perform content conversion. If both the branch device 402 and the second device 404 have the content conversion function, the second device 404 may also be requested to perform content conversion.

In operation 620, the second device 404 transmits a message indicating that preparation of content conversion is completed to the source device 400.

The messages exchanged in operations 604 to 622 may be link-layer messages. Network layers in an AV network according to an exemplary embodiment may include a physical layer, a link layer, and an application layer. The physical layer defines an interface between a device and a data transmission medium. The application layer defines protocols for various services provided via the AV network. The link layer is disposed between the physical layer and the application layer, and allows data exchanged via the AV network to be exactly delivered to a target device. The messages exchanged in operations 604 to 622 are exchanged for setting of a network for streaming, and may thus be exchanged as link-layer messages between the devices.

In operation 622, the source device 400 receiving the message transmitted in operation 620 informs the second device 404 that preparation for additional streaming is completed. That is, a response message to the message requesting additional streaming, which was transmitted in operation 602, may be transmitted to the second device 404. As described above with reference to operation 602, the response message may be an application-layer message, and the response message may be transmitted to a third device other than the second device 404.

In operation 624, the source device 400 streams the content to the first device 406 and the second device 404. The content may be uncompressed video content. The source device 400 streams the content, which is being streamed to the first device 406, to the branch device 402. The branch device 402 directly transmits the content to the first device 406, and makes a copy of the content and transmits the copy of the content to the second device 404. The second device 404 itself reproduces the received content according to the performance capabilities of the second device 404.

Figure 7:
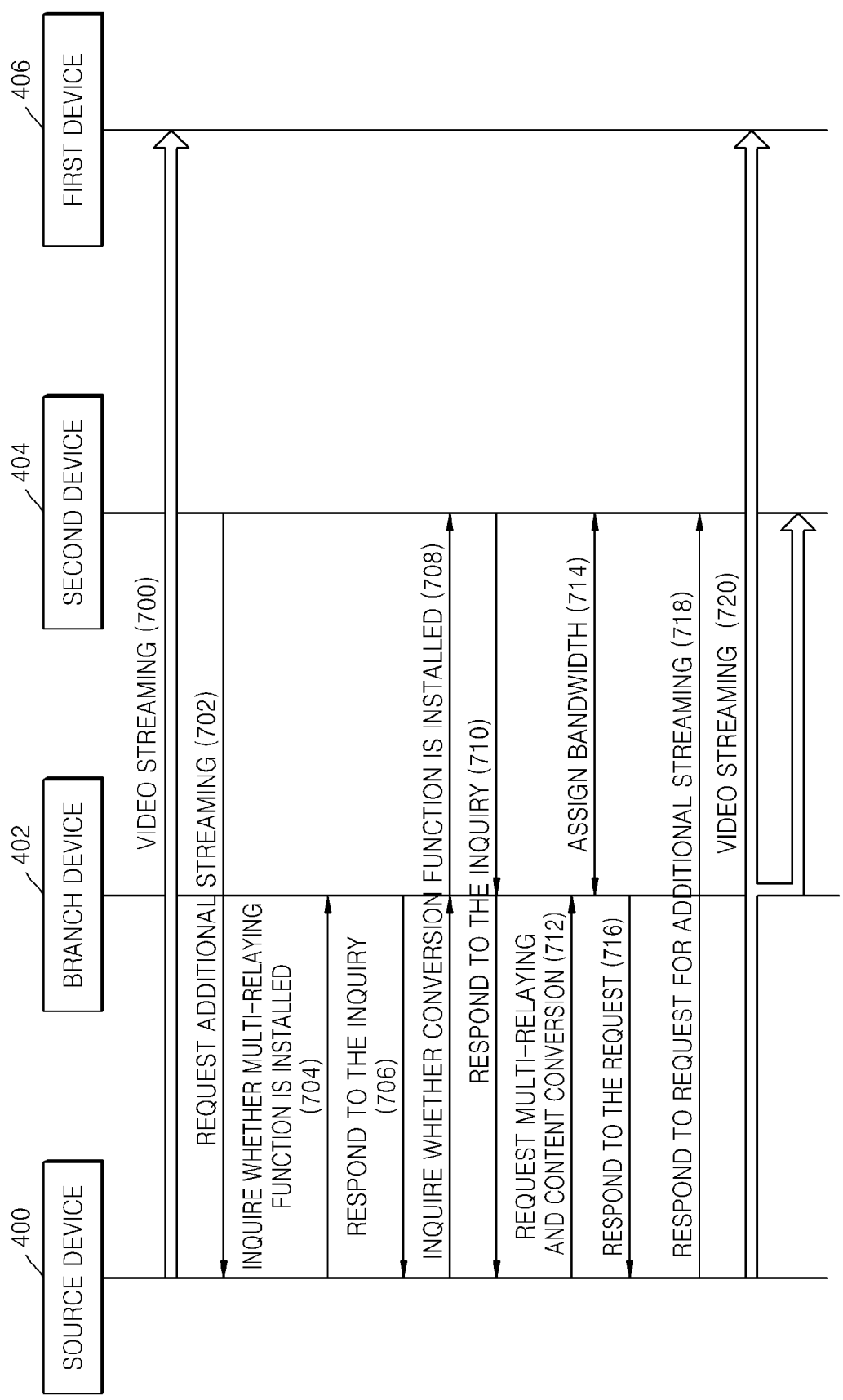
FIG. 7 is a flowchart illustrating a streaming method according to another exemplary embodiment.

FIG. 7 is a flowchart illustrating a streaming method according to another exemplary embodiment.

In FIG. 7, operations 700, 702, 704, 706, 708, and 710 correspond to operations 600, 602, 604, 606, 608, and 610 of FIG. 6, respectively.

In operation 712, a source device 400 requests a branch device 402 to perform multi-relaying and content conversion. The source 400 transmits a message requesting content, which is streamed to the first device 406, to be copied and relayed to a second device 404 and a message requesting the content to be converted according to performance of the second device 404, to a branch device 402.

In the previous exemplary embodiment of FIG. 6, the branch device 402 relays the content but does not perform content conversion, whereas in the current exemplary embodiment of FIG. 7, the branch device 402 not only relays the content but also performs content conversion. Thus, in operation 712, the source device 400 transmits both the message requesting the relaying of the content and the message requesting content conversion to the branch device 402.

In operation 714, the branch device 402 assigns a bandwidth for relaying and transmitting the content to the second device 404. Operation 714 corresponds to operation 614 of FIG. 6.

In operation 716, the second device 404 transmits a message indicating that preparation for the relaying of the content and content conversion is completed to the source device 400.

In operation 718, the source device 400 receiving the message transmitted in operation 716 transmits a message indicating preparation for additional streaming is completed, to the second device 404. Operation 718 corresponds to operation 622 of FIG. 6.

Messages exchanged in operations 702 to 718 may be link-layer messages, similar to in operations 604 to 622.

In operation 720, the source device 400 streams content to the first device 406 and the second device 404. Operation 720 corresponds to operation 624 of FIG. 6.

During the streaming of the content in operation 624 of FIG. 6 or operation 720 of FIG. 7, various message for controlling the streaming may be exchanged between the source device 400, the branch device 402, and the second device 404.

For example, during the streaming of the content, the source device 400 may request the branch device 402 to stop the relaying of the content. In operation 624, the branch device 402 relays the content to the first device 406 and the second device 404. The source device 400 may transmit a message requesting stopping of at least one from among the relaying of the content to the first device 406 and the relaying of the content to the second device 404, to the branch device 402. The stopping of the relaying of the content may be requested by transmitting a message, in which the format of the message requesting multi-relaying, which is transmitted from the source device 400 in operation 612, is directly used and some of the parameters in this message are changed.

Also, the source device 400 may request the branch device 402 or the second device 404 to stop content conversion. In this case, the stopping of content conversion may be requested by transmitting a message, in which the format of the message requesting content conversion, which is transmitted from the source device 400 in operation 618, is directly used and some of the parameters in this message are changed.

When a malfunction or an error occurs during the streaming of the content, a message informing of this fact may be exchanged between the devices 400 to 406. For example, if an error occurs in the relaying of the content, the branch device 402 may transmit a message informing this face to the source device 400. If an error occurs in content conversion, the branch device 402 or the second device 404 may transmit a message informing this fact to the source device 400. Different event codes may be assigned to various errors, respectively, and a message containing one of the event codes may be exchanged.

If the source device 400 receives a message related to occurrence of an error, the source device 400 may inform a third device of the occurrence of the error. The third device may manage the network or content streaming.

Figure 8:
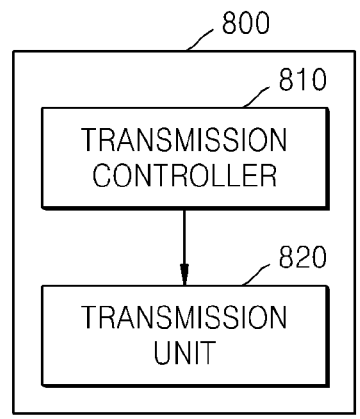
FIG. 8 is a block diagram of a content transmitting device of a source device, according to an exemplary embodiment.

FIG. 8 is a block diagram of a content transmitting device 800 of a source device, according to an exemplary embodiment.

Referring to FIG. 8, the content transmitting device 800 includes a transmission controller 810 and a transmission unit 820. The content transmitting device 800 may be included in the source device 400 described above.

Referring to FIGS. 4 and 8, the transmission controller 810 transmits a message inquiring whether a content conversion function of converting content according to the performance of the second device 404 is installed, to at least one from among the branch device 402 and the second device 404, and receives a response message to the inquiry from at least one from among the branch device 402 and the second device 404. If the transmission controller 810 receives the response message indicating that the content conversion function is installed from at least one from among the branch device 402 and the second device 404, the transmission controller 810 requests the branch device 402 and/or the second device 404, which has the content conversion function, to perform content conversion. The transmission controller 810 may transmit a message whether a content relaying function is installed to the branch device 402, and receive a response message from the branch device 402. For multiple streaming according to an exemplary embodiment, messages exchanged between the transmission controller 810, the branch device 402, and the second device 404 have been described above with reference to FIGS. 4 to 7.

The transmission unit 820 transmits content to the branch device 402. The content that is also streamed to the first device 406, is relayed to the second device 404 by the branch device 402. Also, the content may be converted according to the performance of the second device 404 by the branch device 402 or the second device 404.

Figure 9:
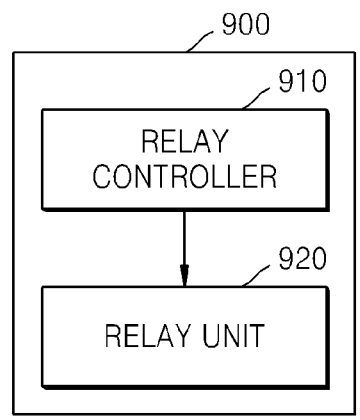
FIG. 9 is a block diagram of a content relaying device of a branch device, according to an exemplary embodiment.

FIG. 9 is a block diagram of a content relaying device 900 of a branch device, according to an exemplary embodiment.

Referring to FIG. 9, the content relaying device 900 includes a relay controller 910 and a relay unit 920. The content relaying device 900 may be included in the branch device 402 described above.

Referring to FIGS. 4 and 9, the relay controller 910 receives a message inquiring about whether a content conversion function is installed from the source device 400, and transmits a response message to the source device 400. A response message indicating that the content conversion function is installed or is not installed may be transmitted to the source device 400. If the content conversion function is not installed, such a response message may not be transmitted. The response message indicating that the content conversion function is installed may be transmitted to the source device 400, and a message requesting content conversion may be received from the source device 400.

Also, the relay controller 910 may receive a message inquiring whether the branch device 402 has a content relaying function from the source device 400, and transmit a response message to the source device 400. The relay controller 910 may receive a message requesting relaying of content and a message requesting content conversion from the source device 400. For multiple streaming according to an exemplary embodiment, messages exchanged between the relay controller 910 and the source device 400 have been described above with reference to FIGS. 4 to 7.

The relay unit 920 receives content from the source device 400, and transmits the content to the first device 406 and the second device 404. The content received from the source device 400 may be converted according to the performance of the second device 404 and then be transmitted to the second device 404.

Figure 10:
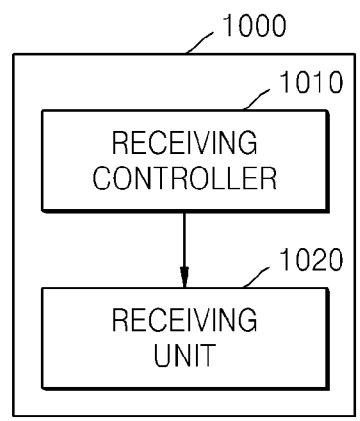
FIG. 10 is a block diagram of a content receiving device of a sink device, according to an exemplary embodiment.

FIG. 10 is a block diagram of a content receiving device 1000 of a sink device, according to an exemplary embodiment.

Referring to FIG. 10, the content receiving device 1000 includes a receiving controller 1010 and a receiving unit 1020. The content receiving device 1000 may be included in the second device 404 described above.

Referring to FIGS. 4 and 10, the receiving controller 1010 receives a message inquiring about whether a content conversion function is installed from the source device 400, and transmits a response message to the source device 400. A response message indicating that the content conversion function is installed or is not installed may be transmitted to the source device 400. If the receiving controller 1010 does not have the content conversion function, the receiving controller 1010 may not transmit the response message. The receiving controller 1010 may transmit the response message indicating that the content conversion function is installed to the source device 400, and may receive a message requesting content conversion from the source device 400. For multiple streaming according to an exemplary embodiment, messages exchanged between the receiving controller 1010 and the source device 400 have been described above with reference to FIGS. 4 to 7.

The receiving unit 1020 receives content relayed by the branch device 402. The receiving unit 1020 may receive content converted by the branch device 402 according to the performance of the second device 404, or may receive content that is not converted from the branch device 402.

The transmission controller 810, the relay controller 910, and the receiving controller 1010 may each be implemented by one or more central processing units (CPUs).

According to the above exemplary embodiments of the present inventive concept, content is transmitted to a device after whether the device has a content conversion function is checked. Thus, it is possible to prevent a malfunction of a streaming system, caused when content is simultaneously streamed to a plurality of devices. Also, a source device may perform multiple streaming by transmitting content to a branch device, similar to a manner in which the content is streamed to one device. Accordingly, it is possible to more effectively use a bandwidth for streaming.

While the present inventive concept has been particularly shown and described with reference to exemplary embodiments thereof and the accompanying drawings, it would be appreciated by those of ordinary skill in the art that changes may be made in these exemplary embodiments without departing from the principles and spirit of the invention, the scope of which is defined in the claims and their equivalents. Also, a system according to the present inventive concept may be embodied as computer readable code in a computer readable recording medium.

For example, each of a content transmitting device, a content relaying device, and a content receiving device according to exemplary embodiments may include a bus coupled to the units of the devices illustrated in FIGS. 8, 9, and 10, and at least one processor connected to the bus. Each of the content transmitting device, the content relaying device, and the content receiving device may further include a memory that is connected to the bus so as to store commands, received messages, or produced messages and is coupled to the at least one processor to perform the operations described above.

The computer readable recording medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable recording medium can be distributed among computer systems that are interconnected through a network, and a method according to one or more exemplary embodiments may be stored and implemented as computer readable code in the distributed system.

What is claimed is:

1. A method of transmitting content from a source device, the method comprising:
    transmitting a message to at least one from among a branch device and a second device, the message inquiring whether a conversion function for converting content that is streamed to a first device, is installed on the branch device or second device;

receiving, by the source device, a response to the transmitted message indicating that the conversion function is installed from at least one from among the branch device and the second device;

transmitting a message requesting conversion of the content to at least one from among the branch device and the second device, the at least one from among the branch device and the second device including the conversion function; and transmitting the content to the branch device, wherein the branch device is connected between the source device and the first and second devices and relays the same content from the source device to the first device and the second device, respectively, wherein the content is selectively converted by the branch device or the second device according to the transmitted message requesting the conversion of the content, according to performance capabilities of the second device, and wherein if the content is to be converted by the branch device, the branch device converts the content and relays the converted content to the second device, and if the content is to be converted by the second device, the branch device relays unconverted content to the second device to be converted by the second device.

2. The method of claim 1, wherein the content is uncompressed video content, and
the first device, the second device, and the branch device are connected via an audio/video (AV) interface.

3. The method of claim 2, wherein the conversion function converts a resolution of the uncompressed video content to a resolution that is reproducible by the second device.

4. The method of claim 1, wherein the receiving of the response to the transmitted message indicating that the conversion function is installed comprises receiving a message indicating that the conversion function is installed from the branch device, and
the transmitting of the message requesting conversion of the content comprises transmitting a message requesting the content to be relayed to the second device and a message requesting conversion of the content, to the branch device.

5. The method of claim 1, wherein the receiving of the response to the transmitted message indicating that the conversion function is installed comprises receiving a message indicating that the conversion function is installed from the second device, and
the transmitting of the message requesting conversion of the content comprises:
transmitting a message requesting the content to be relayed to the second device, to the branch device; and
transmitting the message requesting conversion of the content to the second device.

6. The method of claim 1, before the transmitting of the message inquiring whether the conversion function is installed, further comprising:
transmitting a message inquiring whether a relay function is installed in the branch device, the relay function for relaying the content, which is streamed to the first device, to the second device; and
receiving a message indicating that the relay function is installed from the branch device.

7. A method of relaying content by using a branch device, the method comprising:
receiving a message, from a source device that transmits content to be streamed to a first device, inquiring whether a conversion function is installed in the branch device, wherein the conversion function is a function for converting the content according to performance capabilities of a second device;

transmitting a message indicating whether the conversion function is installed in the branch device, to the source device;

receiving a message from the source device requesting conversion of the content; and receiving the content from the source device, selectively converting the content by one of the branch device and the second device according to the received message from the source device requesting the conversion of the content, according to the performance capabilities of the second device, and transmitting the converted content or unconverted content to the second device, wherein the branch device is connected between the source device and the first and second devices and relays the same content from the source device to the first device and the second device, respectively.

8. The method of claim 7, wherein the content is uncompressed video content, and
the first device, the second device, and the branch device are connected via an audio/video (AV) interface.

9. The method of claim 8, wherein the conversion function converts a resolution of the uncompressed video content to a resolution reproducible by the second device.

10. The method of claim 7, before the receiving of the message inquiring whether the conversion function is installed, further comprising:
receiving a message from the source device inquiring whether a relay function is installed in the branch device, wherein the relay function is a function for relaying the content, which is streamed to the first device, to the second device; and
transmitting a message indicating that the relay function is installed to the branch device.

11. A method performed by a second device for allowing the second device to receive content, the method comprising:
receiving a message, from a source device that transmits content to be streamed to a first device, inquiring whether a conversion function is installed in the second device, wherein the conversion function is a function for converting the content according to performance capabilities of a second device;

transmitting a message to the source device indicating whether the conversion function is installed in the second device;

receiving a message from the source device requesting conversion of the content;

receiving the content via a branch device that also relays the content to the first device; and receiving unconverted content from the branch device to be converted by the second device or receiving converted content that is converted by the branch device, according to the received message from the source device requesting the conversion of the content, according to the performance capabilities of the second device, wherein the branch device is connected between the source device and the first and second devices and relays the same content from the source device to the first device and the second device, respectively.

12. The method of claim 11, wherein the content is uncompressed video content, and
the first device, the second device, and the branch device are connected via an audio/video (AV) interface.

13. The method of claim 12, wherein the conversion function converts a resolution of the uncompressed video content to a resolution that is reproducible by the second device.

14. An apparatus for transmitting content from a source device, the apparatus comprising:
- a transmission controller for transmitting a message to at least one from among a branch device and a second device, the message inquiring whether a conversion function for converting content that is streamed to a first device, is installed on the branch device or second device; receiving a response to the transmitted message indicating that the conversion function is installed from at least one from among the branch device and the second device; and transmitting a message requesting conversion of the content to at least one from among the branch device and the second device, the at least one from among the branch device and the second device including the conversion function; and
- a transmission unit for transmitting the content to the branch device,
- wherein the branch device is connected between the source device and the first and second devices and relays the same content from the source device to the first device and the second device, respectively,
- wherein the content is selectively converted by the branch device or the second device according to the transmitted message requesting the conversion of the content, according to performance capabilities of the second device, and
- wherein if the content is to be converted by the branch device, the branch device converts the content and relays the converted content to the second device, and if the content is to be converted by the second device, the branch device relays unconverted content to the second device to be converted by the second device.

15. An apparatus for relaying content by using a branch device, the apparatus comprising:
- a relay controller for receiving a message, from a source device that transmits content to be streamed to a first device, inquiring whether a conversion function is installed in the branch device, wherein the conversion function is a function for converting the content according to performance capabilities of a second device; transmitting a message indicating whether the conversion function is installed in the branch device, to the source device; and receiving a message from the source device requesting conversion of the content; and
- a relay unit for receiving the content from the source device, selectively converting the content by one of the branch device and the second device according to the received message from the source device requesting the conversion of the content, according to the performance capabilities of the second device, and transmitting the converted content or unconverted content to the second device,
- wherein the branch device is connected between the source device and the first and second devices and relays the same content from the source device to the first device and the second device, respectively.

16. An apparatus comprising:
- a receiving controller for receiving a message, from a source device that transmits content to be streamed to a first device, inquiring whether a conversion function is installed, wherein the conversion function is a function for converting the content according to performance capabilities of a second device; transmitting a message to the source device indicating whether the conversion function is installed; and receiving a message from the source device requesting conversion of the content; and
- a receiving unit for receiving the content via a branch device that also relays the content to the first device,
- wherein the branch device is connected between the source device and the first and second devices and relays the same content from the source device to the first device and the second device, respectively,
- wherein the content is selectively converted by one of the branch device and the second device according to the received message from the source device requesting the conversion of the content, according to the performance capabilities of the second device, and
- wherein if the content is to be converted by the branch device, the branch device converts the content and relays the converted content to the second device, and if the content is to be converted by the second device, the branch device relays unconverted content to the second device to be converted by the second device.

17. A non-transitory computer readable recording medium having recorded thereon a program for executing a method of transmitting content from a source device, the method comprising:
- transmitting a message to at least one from among a branch device and a second device, the message inquiring whether a conversion function for converting content that is streamed to a first device, is installed on the branch device or second device;
- receiving a response to the transmitted message indicating that the conversion function is installed from at least one from among the branch device and the second device;
- transmitting a message requesting conversion of the content to at least one from among the branch device and the second device, the at least one from among the branch device and the second device including the conversion function; and
- transmitting the content to the branch device,
- wherein the branch device is connected between the source device and the first and second devices and relays the same content from the source device to the first device and the second device, respectively,
- wherein the content is selectively converted by the branch device or the second device according to the transmitted message requesting the conversion of the content, according to performance capabilities of the second device, and
- wherein if the content is to be converted by the branch device, the branch device converts the content and relays the converted content to the second device, and if the content is to be converted by the second device, the branch device relays unconverted content to the second device to be converted by the second device.

18. A non-transitory computer readable recording medium having recorded thereon a program for executing a method of relaying content by using a branch device, the method comprising:
- receiving a message, from a source device that transmits content to be streamed to a first device, inquiring whether a conversion function is installed in the branch device, wherein the conversion function is a function for converting the content according to performance capabilities of a second device;

transmitting a message indicating whether the conversion function is installed in the branch device, to the source device;

receiving a message from the source device requesting conversion of the content; and receiving the content from the source device, selectively converting the content by one of the branch device and the second device according to the received message from the source device requesting the conversion of the content, according to the performance capabilities of the second device, and transmitting the converted content or unconverted content to the second device, wherein the branch device is connected between the source device and the first and second devices and relays the same content from the source device to the first device and the second device, respectively.

19. A non-transitory computer readable recording medium having recorded thereon a program for executing a method performed by a second device for allowing the second device to receive content, the method comprising:

receiving a message, from a source device that transmits content to be streamed to a first device, inquiring whether a conversion function is installed, wherein the conversion function is a function for converting the content according to performance capabilities of a second device;

transmitting a message to the source device indicating whether the conversion function is installed;

receiving a message from the source device requesting conversion of the content;

receiving the content via a branch device that also relays the content to the first device; and selectively converting the content by one of the branch device and the second device according to the received message from the source device requesting the conversion of the content, according to the performance capabilities of the second device, wherein the branch device is connected between the source device and the first and second devices and relays the same content from the source device to the first device and the second device, respectively, and wherein if the content is to be converted by the branch device, the branch device converts the content and relays the converted content to the second device, and if the content is to be converted by the second device, the branch device relays unconverted content to the second device to be converted by the second device.

20. The method of claim 1, wherein, in response to the message requesting conversion of the content being transmitted to the branch device, the branch device converts the content and relays the converted content to the second device, and in response to the message requesting conversion of the content being transmitted to the second device, the second device converts the unconverted content that is relayed by the branch device to the second device.

* * * * *